United States Patent
Craven

(12) 
(10) Patent No.: US 6,250,831 B1
(45) Date of Patent: Jun. 26, 2001

(54) COMBINATION SQUEEGEE AND RADIATOR-FILL APPARATUS

(76) Inventor: Curtis L. Craven, 2160 Roth Way, Turlock, CA (US) 95380

( * ) Notice: Subject to any disclaimer, the term of this patent is extended or adjusted under 35 U.S.C. 154(b) by 0 days.

(21) Appl. No.: 09/004,698

(22) Filed: Jan. 8, 1998

(51) Int. Cl.$^7$ .................................................. B43K 5/18
(52) U.S. Cl. ......................... 401/139; 401/137; 401/25; 401/26; 401/27; 401/261
(58) Field of Search .................. 401/22, 23, 25, 401/26, 27, 136, 137, 139, 146, 149, 261; 138/127, 174

(56) References Cited

U.S. PATENT DOCUMENTS

| | | | |
|---|---|---|---|
| 556,722 | 3/1896 | Ford | 401/136 |
| 622,809 | * 4/1899 | Keyser . | |
| 1,655,585 | 1/1928 | Wagner | 401/15 |
| 2,497,674 | 2/1950 | Kolchinsk | 19/289 |
| 2,672,638 | 3/1954 | Blum | 401/139 |
| 2,722,701 | 11/1955 | Blum | 401/139 |
| 3,377,123 | * 4/1968 | Leeson | 401/139 |
| 3,810,702 | 5/1974 | Benz | 401/139 |
| 4,778,298 | * 10/1988 | Shin et al. | 401/27 |

OTHER PUBLICATIONS

Australian Pat. No. 278,014 issued in 1967 to Milne.
French Patent No. 1,417,845 issued to Borutzki in 1965.

* cited by examiner

Primary Examiner—Henry J. Recla
Assistant Examiner—Dana Richard
(74) Attorney, Agent, or Firm—Joseph E. Gerber

(57) ABSTRACT

The apparatus has an elongate, rigid, tubular body with a universal-type swivel coupling to a water hose at its proximal end, and a transverse head bar disposed at the distal end, the head bar having a scrubbing sponge and wiping blade projecting therefrom in opposite directions. A flexible, distally-projecting, selectively-directable, fluid-emitting nozzle is in fluid communication with the water hose and can be used for wetting a dirty window or for filling a radiator. The distal, fluid-emitting nozzle is constructed of multiple segments which can be swiveled and set in a stable position with respect to one another; a flexible, resilient sheath covers the segments. The scrubbing sponge is covered with a layer of slightly abrasive, foraminous material, and is impregnated with a concentrated, water-soluble, cleaning-enhancing compound.

20 Claims, 3 Drawing Sheets

COMBINATION SQUEEGEE AND RADIATOR-FILL APPARATUS

BACKGROUND OF THE INVENTION

1. Field of the Invention

The present invention relates generally to apparatus such as squeegees for cleaning glass windows and other smooth, polished surfaces, and more specifically to apparatus used in automobile service stations for cleaning automobile and truck windshields.

2. Description of the Related Art

Although a great majority of modern auto service stations have in recent years converted to a self-service business style, most conscientious station management nevertheless attempts to make the self-service environment as convenient as possible to customers. This includes providing, in addition to self-service gasoline pumps, handy access to tire air and radiator water delivery hoses, paper towels and a windshield-cleaning squeegee. However, despite the convenience they add, these additional accessory items require additional equipment, and constant attention and maintenance, because they are so frequently worn out, used up, stolen and/or negligently or intentionally damaged.

For example, a service station providing a windshield squeegee for customers' use must normally also provide a bucket or wall-mounted reservoir containing windshield washing detergent or solvent. In addition to the effort and expense of providing and perhaps installing these, personnel needs to attend to keeping such bucket or reservoir full and from being stolen, along with the squeegee. Indeed, in some locations, an untethered squeegee will not last more than an hour or two before being stolen and needing to be replaced, thus making it economically impossible for management there to provide the convenience of a squeegee to its customers. And, where window-cleaning squeegees get high-volume use, personnel needs to re-fill reservoirs every hour, or two, thus distracting personnel from other duties.

Water delivery hoses of the type normally used for filling an automobile radiator may be relied upon for window-cleaning water, but these too are subject to wear, negligent damage, vandalism and theft. The valved nozzles at the hose ends are run over and damaged, or cut off by thieves; sometimes, the entire length of a hose is stolen. Further, the conventional construction of these valved nozzles is often not advantageous to automobile service station customers' use. For example, in operating a valved nozzle to fill a hot radiator, the user's hand must be very close to the radiator and other hot parts in an engine compartment which may cause burns. Conventional garden-type hoses without nozzled ends may merely be inserted into a radiator neck; but, these have drawbacks, as well, in that water flow and volume must be controlled with a bibcock at the input end of the hose. This makes it very difficult to monitor the fill-level of a radiator unless the vehicle is able to be pulled up close to the bibcock at the hose's input end.

Squeegees which have their own water or solvent delivery systems are known. One example is shown in U.S. Pat. No. 556,722 issued to Ford in 1896 which shows a combination brush and squeegee having a hollow handle connected to a hose which delivers water to the cleaning head of the apparatus, wherein a petcock with a drain valve is integrally mounted in the handle. As another example, Wagner, in U.S. Pat. No. 1,655,585 issued in 1928, shows a "washing head" for washing and drying windows. Wagner employs small apertures for fluid delivery to the cleaning portion of the washing head, and an in-line, two-way valve for switching between cleaning and drying fluid. U.S. Pat. No. 2,672,638 issued to Blum in 1954 shows a cleaner specifically designed for cleaning opposing faces of closely adjacent windows. Blum employs a self-wetting squeegee in fluid communication with a pressurized reservoir, the squeegee having a washing element, a wiping element, spray nozzles and a fluid flow control valve. Benz, in U.S. Pat. No. 3,810,702 issued in 1974, shows water delivered to a window cleaning sponge by a hose which runs outside, and parallel to, rods upon which the sponge is suspended. A channel through Benz's transverse sponge support delivers water to small apertures for emitting spray adjacent the sponge. Water flow in Benz's device is via the hose's own control valve. Australian Patent No. 278,014, issued in 1967 to Milne, shows a floor cleaning squeegee wherein fluid is delivered through the handle to the squeegee head via apertures in close relation therewith. Milne also suggests use of an in-line detergent reservoir for adding detergent to the water flowing from the water source to the cleaning head. All of these devices may yield advantages in certain situations. However, the hoses that supply these squeegees with water could be easily cut by thieves. And, such self-wetting squeegees do not promote the greatest economy in the service station environment, because they require purchase and maintenance of a second water hose in addition to the radiator water hose already installed at most service stations.

Squeegees which deliver detergent or solvent through integral fluid-delivery conduits are known. Examples include that shown in the Australian Patent to Milne, cited above. However, such systems would not be easy to regulate in a service station environment; waste would be likely.

Thus, it appears that a need exists for a window-cleaning squeegee which is theft and damage resistant, along with a long-lasting, easily-regulatable, window-cleaning detergent or solvent source. And, it also appears that it would be beneficial if service station management could offer customers a safe and convenient source of radiator water, without that water service being vulnerable to damage and theft.

SUMMARY OF THE INVENTION

The combination squeegee and radiator-fill apparatus of the present invention is adapted to overcome the above-noted shortcomings and to fulfill the stated needs. It comprises an elongate, rigid body with means for delivering fluid from the body's proximal end to its distal end. At the body's proximal end, means are provided for engaging the fluid delivering means with a conduit to a pressurized fluid source. The body's distal end includes a resilient wiping blade, and a flexible, distally-projecting, selectively-directable, fluid-emitting nozzle in fluid communication with the fluid delivering means. A preferred embodiment of the invention also includes means at the apparatus' proximal end for regulating fluid flow, and means for scrubbing a surface, wherein the scrubbing means is impregnated with concentrated, water-soluble, cleaning-enhancing means.

It is an object of the present invention to provide multi-purpose, resource-maximizing customer convenience equipment for use in the automobile service station environment.

It is a further object of the present invention to provide a durable, theft-resistant window-cleaning squeegee for public use in the automobile service station environment.

Another object of this invention is to provide a window cleaning squeegee that does not require provision and maintenance of a bucket or reservoir for window cleaning solution.

Another object of the present invention is to provide a squeegee for use by customers in an automobile service station environment, wherein the squeegee includes a scrubbing element and means for delivering a cleaning-enhancing compound.

Yet another object of the present invention is to provide a window-cleaning scrubber and squeegee which has the ability to deliver both cleaning-enhancing compound and rinse water to a window.

A further object of the invention is to provide a window-cleaning scrubber and squeegee which has the ability to deliver cleaning-enhancing compound and rinse water to a window, separately.

And, it is also an object of the present invention to provide window washing apparatus having means for slow, extremely economical delivery a cleaning-enhancing compound.

Yet a further object of the present invention is to provide a squeegee for use in the automobile service station environment which serves an additional function as a radiator-filling, water hose.

Still a further object of the present invention is to provide a radiator-filling water hose that is durable and theft-resistant.

It is an additional object of the present invention to provide an automobile service station water hose that reduces the likelihood of a user being burned in filling a hot radiator.

Still further objects of the inventive apparatus disclosed herein will be apparent from the drawings and following detailed description thereof.

DESCRIPTION OF THE PREFERRED EMBODIMENT

Figure 1:
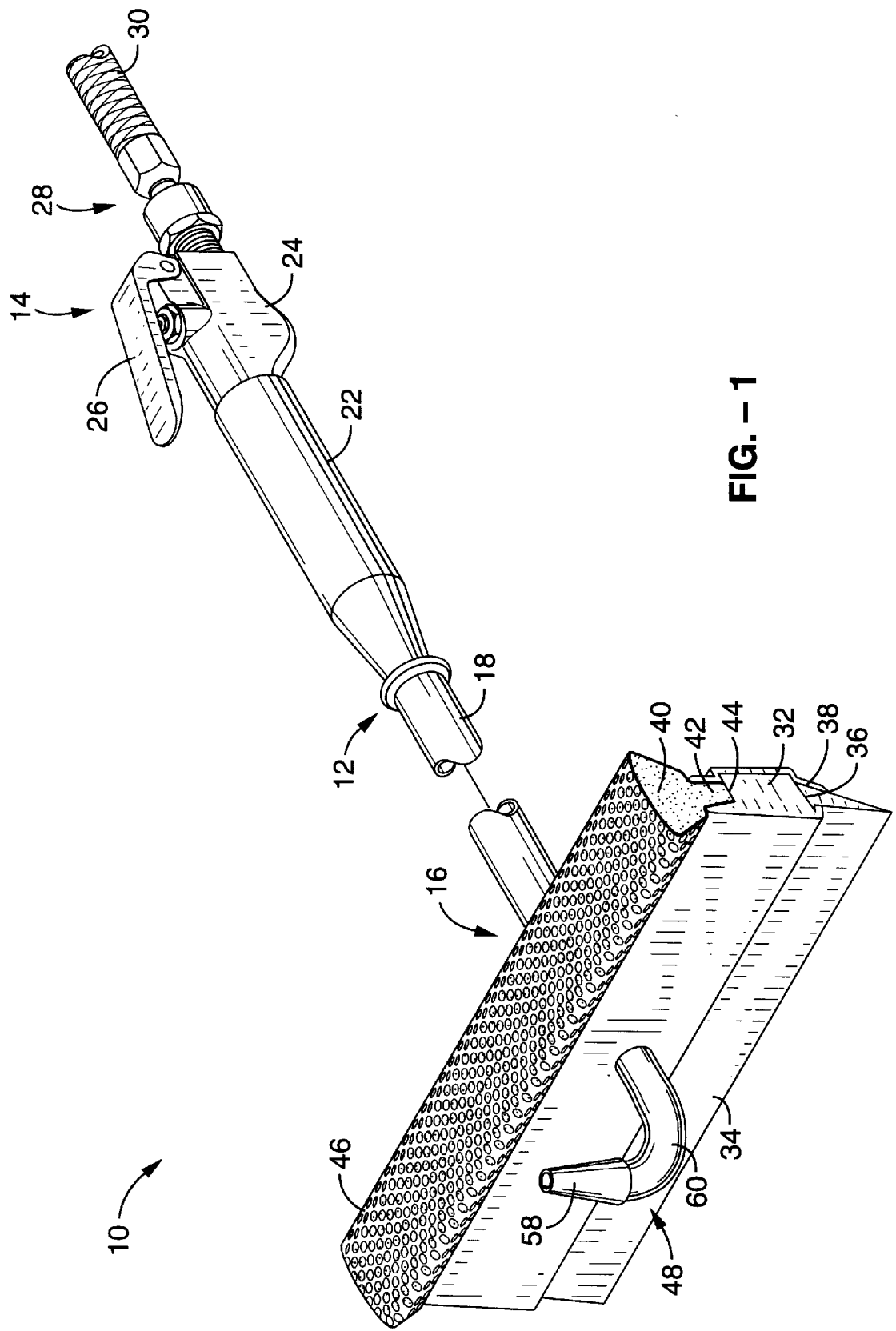
FIG. 1 is a perspective view of the combined squeegee and radiator-fill apparatus of the invention.
Figure 2:
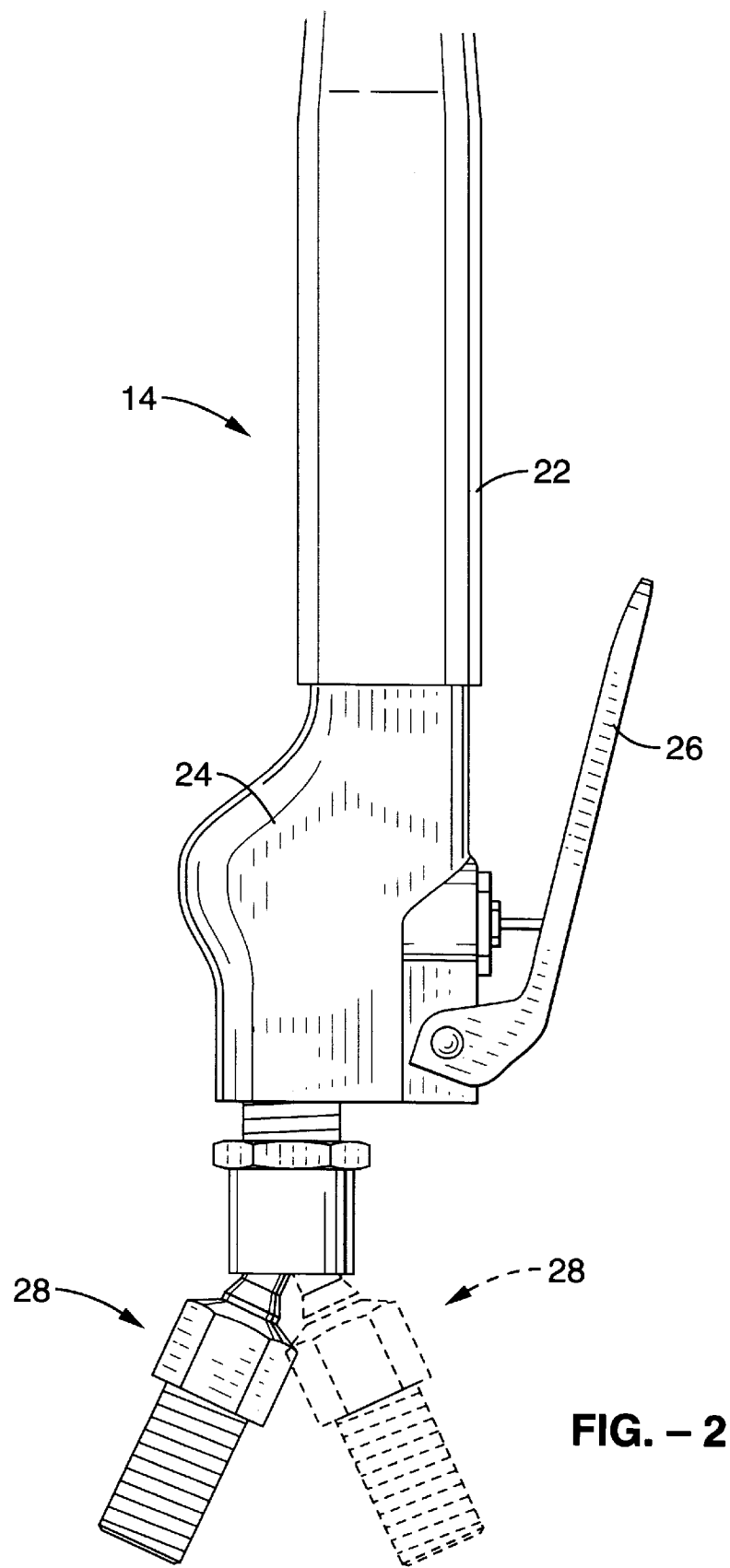
FIG. 2 is a side elevational view of the handle portion of the apparatus of FIG. 1.
Figure 3:
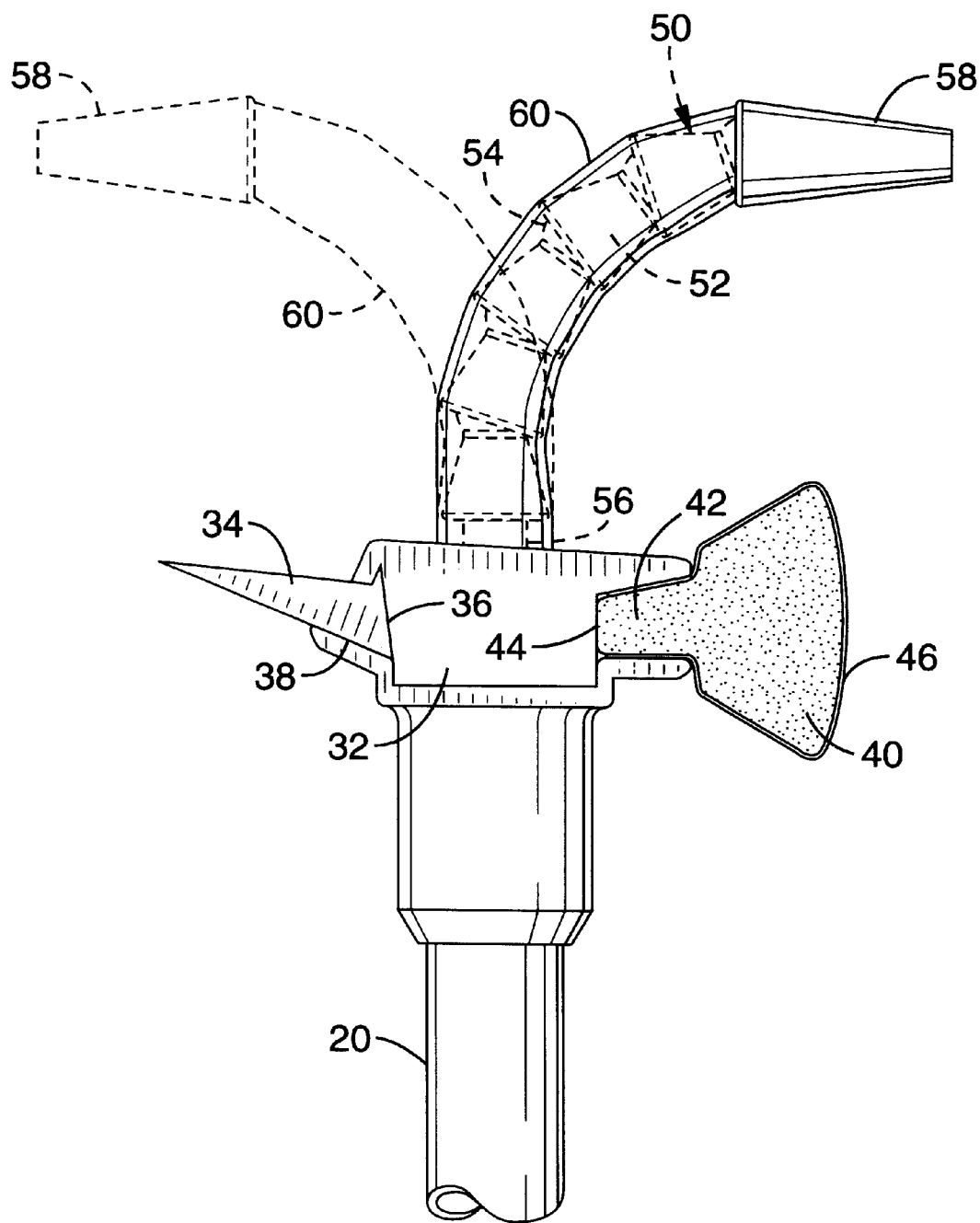
FIG. 3 is a side elevational view of the head portion of the apparatus of FIG. 1, showing the range of movement of the fluid-emitting nozzle.

Referring now specifically to the drawings, FIGS. 1 through 3 show the inventive combination squeegee and radiator-fill apparatus, which is generally identified herein with the reference numeral 10. Apparatus 10 generally includes an elongate body portion 12, a handle portion 14 and a head portion 16.

Body portion 12 is constructed of a length of rigid, tubular metal or plastic roughly one-half inch in diameter and approximately 18 inches long. Body portion 12 has a proximal end 18 and a distal end 20. Handle portion 14 is disposed at body portion 12's proximal end 18 and head portion 16 is disposed at body portion 12's distal end.

Orientation of all elements herein will be in reference to the proximal and distal ends 18 and 20 of body portion 12. Thus, proximal end 18 and all elements herein designated as being "proximal" will be understood to be located or oriented closer to the user and/or in the direction of handle portion 14. And, distal end 20 and all elements herein designated as being "distal" will be understood to be located or oriented farther away from the user and toward head portion 16.

As shown in FIGS. 1 and 2, handle portion 14 is comprised of an enlarged tubular section 22 and a hand-grip valve 24. Enlarged tubular section 22 is of a greater diameter than body portion 12, and is axially aligned with and in fluid communication with body portion 12. Enlarged tubular portion 22 is securely engaged with the proximal end of body portion 12 and is comprised of tubular plastic or metal roughly one inch in diameter. This enlarged diameter of enlarged tubular section 22 has been found easier for the user to grasp for best hand control of the apparatus.

Hand-grip valve 24 is securely engaged in axial alignment with, and in fluid communication with, the proximal end of enlarged tubular section 22. Hand-grip valve 24 is of a conventional type operable for selective modulation of the flow of fluid passing from its proximal end to its distal end. Light hand pressure on valve lever 26 allows low volume flow; heavy hand pressure allows high volume flow. When hand pressure on valve lever 26 is released, fluid flow stops.

The distal portion of swivel coupling 28 is securely engaged with the proximal end of hand-grip valve 24. Swivel coupling 28 includes a conventional fluid-tight, flexible, universal-type joint (unnumbered) permitting substantial flexibility between proximal and distal portions of swivel coupling 28, as shown in FIG. 2. The proximal portion of swivel coupling 28 is securely engaged with the distal end of armored hose 30.

Armored hose 30 is preferably fairly flexible and very sever-resistant. Hose stock including a steel mesh covering over a resilient rubber interior has been found to work satisfactorily for the purposes intended. Armored hose 30 acts as a conduit to a source-of pressurized fluid, such as tap water. Alternatively, aqueous detergent or solvents, or recycled water, may be carried therein.

As shown in FIGS. 1 and 3, the primary structural component of head portion 16 is head bar 32. Head bar 32 is an elongate, rigid member constructed of metal or plastic mounted transverse to body portion 12's long axis, at body portion 12's distal end 18. Head bar is preferably approximately 8 to 12 inches long.

Elongate, flexible, resilient rubber wiping blade 34 is mounted securely upon and parallel to the length of head bar 32. Wiping blade 34 is preferably the same length as head bar 32. A blade of generally the same material and structure as those used in a conventional squeegee is preferred. And, any conventional means of mounting wiping blade 34 securely upon head bar 32 may be used. However, it has been found satisfactory to engage the length of a wider, base edge 36 of wiping blade 34 in an elongate, wide-based slot 38 in head bar 32. That is, when viewed in cross section or end-on as in FIG. 3, slot 38 is wider at its base than at its opening. And, wiping blade 34 has a mating, complementary shape in cross-section. If slot 38 is tight enough, it will prevent removal of wiping blade 34 therefrom, even by sliding blade 34 in a lateral direction in slot 38. However, for yet greater integrity and durability, additional fastening means such as adhesives, teeth, screws and/or rivets may be used to bind wiping blade 34 into slot 38.

Sponge 40, also mounted upon and parallel to head bar 32, is also about the same length as head bar 32 and wiping blade 34. Sponge 40 is preferably constructed of resilient, open-celled sponge material suitable for scrubbing dirty windows and like surfaces, and durable enough to retain its integrity during long use. Any conventional means of securely mounting sponge 40 on head bar 32 may be used. However, it has been found satisfactory to engage the length of an inner edge 42 of sponge 40 with an elongate, narrow, gripping slot 44 in head bar 32. Additional fastening means such as adhesives, teeth, screws and/or rivets may be used to bind sponge 40 into gripping slot 44.

Wide-based slot 38 and gripping slot 44 may be cut or molded into head bar 32. Or, head bar 32 may be constructed of multiple, mating pieces, as suggested in (but not separately numbered in) the drawing figures. And, many alternative ways of mounting wiping blade 34 and sponge 40 will be readily apparent to those skilled in the art. However, means that maximize the service life of the apparatus during high use by members of the public are preferred.

As shown in FIG. 1, wiping blade 34 and sponge 40 are of a length substantially similar to one another, and to head bar 32. And, the outer, wiping edge of wiping blade 34 and the outer, scrubbing surface of sponge 40 are preferably each disposed outwardly in opposite directions from one another. However, other dimensions and orientations of a squeegee and sponge may also work satisfactorily without departing from the spirit of the invention.

A layer of durable, slightly abrasive, foraminous material such as nylon net layer 46 is preferably stretched taut over the outer surface of sponge 40, thus rendering sponge 40 more useful for scrubbing very dirty window surfaces. Net layer 46 is generally rectangular and may be fastened taut to the surface of sponge 40 by binding opposed edges of net layer 46 in gripping slot 44.

Sponge 40 is preferably impregnated with a concentrated, water-soluble, washing compound such as a soap, detergent or solvent suited to enhancing apparatus 10's ability to clean very dirty glass windows. Whichever of these substances is employed, and choices may be different for different purposes, it is preferred that the substance be activatable upon exposure to water and deactivatable upon drying. One manner of impregnating sponge 40 is to soak it in a highly concentrated solution of cleaning-enhancing compound, and then to let it dry. This may be done while sponge 40 is in place on head bar 32, or it may be done with a separate sponge which is mounted on head bar 32 after impregnation and drying.

Flexible, selectively-directable, fluid-emitting nozzle 48 projects in a generally distal direction from body portion 12's distal end 18, through and beyond head portion 16. Fluid-emitting nozzle 48 is in fluid communication with tubular body portion 12. Fluid emitting nozzle 48 is preferably comprised of a plurality of substantially identical subunits or segments 50. Each segment 50 of fluid emitting nozzle 48 is preferably comprised of a generally conical, proximal portion 52 and an integral, generally spherical, distal portion 54. The conical, proximal portion 52 of each segment 50 has a generally spherical interior (not separately shown or numbered) adapted for secure receipt of the distal, spherical portion 54 of another segment 50. Each segment 50, except for a coupling segment 56 fixed securely to body portion 12's distal end 18 at head bar 32, is able to be swiveled and set in a stable position with respect to an adjacent segment 50. And, each segment 50 is in fluid communication with an adjacent segment. Nozzle tip segment 58 is the most distal segment, and is generally conical in shape. Nozzle tip segment 58 is engaged with only one segment, that being the next segment in the proximal direction, while all other segments 50 are engaged with two other segments. The number of segments 50, 56 and 58 is not critical, but it is preferred that nozzle tip segment 58 be selectively and stably positionable so as to be able to direct fluid emitted therefrom in a direction at least 45 degrees, and preferably 90 degrees, away from the elongate axis of body portion 12. The length of fluid-emitting nozzle 48 is approximately 4 inches, or so, from head bar 32 to tip segment 58.

A flexible, tubular, resilient sheath 60 of durable rubber or plastic preferably covers segments 50 and 56 of fluid-emitting nozzle 48. Sheath 60 reduces the likelihood of dirt and grit entering the joints between the segments, improves the fluidity of motion of nozzle 48 and greatly increases its service life.

In use as a radiator-filling hose, fluid-emitting nozzle 48 of apparatus 10 is bent to a 90-degree angle from the elongate axis of body portion 12. Further, to avoid interference by head bar 32's length, the bend in fluid-emitting nozzle 48 is also preferably at a 90-degree angle to the length of head bar 32, as shown in FIGS. 1 and 3. Once the vehicle's radiator cap is removed, tip segment 58 of nozzle 48 is placed over and directed downward into the radiator neck, and then valve lever 26 of hand-grip valve 24 is squeezed to deliver the amount of water needed. During this operation, the user's hands are able to be kept a safe two feet, or so, from the hot radiator and other hot engine compartment components, while full control over water flow and volume is maintained at hand-grip valve 24.

In use as a window scrubber and squeegee, tip segment 58 of nozzle 48 is first directed at the window to be cleaned, and valve lever 26 of hand-grip valve 24 is squeezed to permit water to flow and thus wet the window's surface. In doing so, fluid-emitting nozzle 48 may be bent or positioned in whatever configuration or orientation is most convenient. However, before using wiping blade 34 or sponge 40 on the wet window, fluid-emitting nozzle 48 must be straightened out so that it is approximately in line with the long axis of body portion 12. This prevents tip segment 58 of nozzle 48 from projecting laterally beyond, and interfering with, wiping blade 34 and/or sponge 40, as it might if it were in one of the positions shown in FIG. 3.

If the window is very dirty and needs to be scrubbed, once nozzle 48 is bent straight, sponge 40 is pressed against the wet window surface and passed back and forth in a scrubbing fashion. The number of passes depends upon the type and thickness of the dirt to be dislodged, as well as the composition of the cleaning-enhancing compound in sponge 40. As the cleaning-enhancing compound impregnated in sponge 40 is moisturized by water on the window's surface, a small amount goes into solution and adds a foaming, chemical cleaning action to the mechanical cleaning action of the scrubbing sponge. This permits oily and greasy dirt, as well as water-soluble dirt, to be lifted from the window's surface. Once lifted, the oil, grease and dirt-laden foam are easily rinsed from the window by again directing tip segment 58 of nozzle 48 at the window's surface and squeezing valve lever 26 of hand-grip valve 24.

Once the window is clean and only water remains, wiping blade 34 is passed over the window's surface just as a conventional squeegee, thus drying the window in a manner that keeps streaking to a minimum.

After use of apparatus 10, sponge 40 tends to dry, thus trapping the remainder of the cleaning-enhancing compound therein. The configuration and method of use of apparatus 10 are especially suited to maximizing the life of a given volume of cleaning-enhancing compound impregnated into sponge 40. This is because running water is not directed at sponge 40; neither is sponge 40 soaked in a large volume of water. Instead, placing impregnated sponge 40 in contact with only the amount of water present on a wet window places a minimal amount of compound into solution, and leaves the rest for a later window cleaning procedure. And, in those instances where a little more cleaning-enhancing solution is needed, or where sponge 40 needs to be slightly wetter, fluid-emitting nozzle 48 may simply be bent so that it is directed at sponge 40, and valve lever 26 may be operated to deliver a small amount of water to sponge 40.

The foregoing detailed disclosure of the inventive, combined squeegee and radiator-fill apparatus 10 is considered as only illustrative of the preferred embodiment of, and not a limitation upon the scope of, the invention. Those skilled in the art will envision many other possible variations in the structure and manner of construction disclosed herein that nevertheless fall within the scope of the following claims. And, alternative uses for this inventive apparatus may later be realized. For example, many other types of smooth, polished surfaces may be cleaned with apparatus 10, especially if different cleaning-enhancing compounds and/or scrubbing materials are used. Accordingly, the scope of the invention should be determined with reference to the appended claims, and not by the examples which have herein been given.

I claim:

1. Combination squeegee and radiator-fill apparatus, comprising:
   a. an elongate, rigid body having proximal and distal ends;
   b. means associated with said body for delivering fluid from said proximal end of said body to said distal end of said body;
   c. means at said proximal end of said body adapted for engaging said fluid delivering means with a conduit to a pressurized fluid source;
   d. a resilient wiping blade disposed at said distal end of said body; and,
   f. a flexible, self-supporting, fluid-emitting nozzele projecting from said distal end of said body, said nozzle being in fluid communication with said fluid delivering means and adapted to be selectively-directed to any one position with respect to said elongated body.

2. The apparatus of claim 1, further including means for modulating fluid flow through said fluid delivering means.

3. The apparatus of claim 2, wherein said fluid flow modulating means comprises a hand-grip valve.

4. The apparatus of claim 1, further including a coupling at said proximal end of said body, a proximal end of said coupling being adapted for engagement with said conduit to a pressurized fluid source, a distal end of said coupling being securely, but swivelably, engaged with, and in fluid communication with, said fluid delivering means.

5. The apparatus of claim 1, wherein said fluid delivering means comprises a channel through said elongate body, said channel being in fluid communication with a swivelable coupling.

6. The apparatus of claim 5, wherein said fluid-emitting nozzle is in fluid communication with said channel through said elongate body.

7. The apparatus of claim 1, wherein said fluid-emitting nozzle includes a tip portion able to be selectively positioned so as to direct fluid emitted therefrom in a direction at least 45 degrees away from an elongate axis of said body.

8. The apparatus of claim 1, wherein said fluid-emitting nozzle is comprised of a plurality of substantially identical segments, each being able to be swiveled and set in a stable position with respect to, and each being in fluid communication with, a more proximal segment.

9. The apparatus of claim 8, wherein each segment of said fluid-emitting nozzle is comprised of a generally conical, proximal portion and an integral, generally spherical, distal portion, said conical, proximal portion of each having a generally spherical interior adapted for secure receipt of said spherical portion of another segment.

10. The apparatus of claim 8, wherein said fluid-emitting nozzle is covered with a flexible sleeve.

11. The apparatus of claim 1, further including resilient means for scrubbing a surface, said scrubbing means being disposed at said distal end of said body.

12. The apparatus of claim 11, wherein said resilient scrubbing means comprises an open-celled sponge.

13. The apparatus of claim 12, further including a layer of slightly abrasive, foraminous material over said sponge.

14. Combination squeegee and radiator-fill apparatus, comprising:
   a. an elongate, rigid body having proximal and distal ends;
   b. means associated with said body for delivering fluid from said proximal end of said body to said distal end of said body;
   c. a coupling at said proximal end of said body, a proximal end of said coupling being adapted for engagement with a conduit to a pressurized fluid source, a distal end of said coupling being securely, but swivelably, engaged with, and in fluid communication with, said fluid delivering means;
   d. a resilient wiping blade disposed at said distal end of said body;
   e. resilient means for scrubbing a surface, said scrubbing means being disposed at said distal end of said body; and,
   f. a flexible, self-supporting, fluid-emitting nozzle projecting from said distal end of said body, said nozzle being in fluid communication with said fluid delivering means and adapted to be selectively-directed to any one position with respect to said elongated body.

15. The apparatus of claim 14, wherein said resilient scrubbing means is elongate and oriented generally perpendicular to said body.

16. The apparatus of claim 14, wherein said resilient wiping blade is elongate and oriented generally perpendicular to said body.

17. The apparatus of claim 14, wherein said resilient scrubbing means and said resilient wiping blade are each elongate, of substantially similar length and oriented parallel to one another.

18. The apparatus of claim 17, wherein said resilient scrubbing means has an outer, scrubbing surface, and wherein said resilient wiping blade has an outer, wiping edge, said scrubbing means and said wiping blade being mounted at said distal end of said body such that said scrubbing surface of said scrubbing means and said wiping edge of said wiping blade are each disposed outwardly in opposite directions from one another.

19. The apparatus of claim 14, wherein said conduit to said pressurized fluid source comprises a flexible hose with a reinforcing, sever-resistant mesh incorporated therewith.

20. The apparatus of claim 14, wherein said scrubbing means is impregnated with concentrated, water-soluble, cleaning-enhancing means.

* * * * *